US012669198B2

(12) United States Patent
Westermann et al.

(10) Patent No.: US 12,669,198 B2
(45) Date of Patent: Jun. 30, 2026

(54) FASTENING ELEMENT OF A T-SHAPED PROFILE HOSE, CONNECTION ARRANGEMENT WITH THE FASTENING ELEMENT, SETTING DEVICE AS WELL AS MANUFACTURING AND CONNECTION METHOD

(71) Applicant: Böllhoff Verbindungstechnik GmbH, Bielefeld (DE)

(72) Inventors: Wilhelm Westermann, Bielefeld (DE); Hubert Jütte, Bielefeld (DE); Benjamin Roeschert, Schlangen (DE); Bernd Haesler, Halle (DE); Oliver Schienstock, Delbrück (DE); Kilian Doedtmann, Bramsche (DE)

(73) Assignee: BÖLLHOFF VERBINDUNGSTECHNIK GMBH, Bielefeld (DE)

( * ) Notice: Subject to any disclaimer, the term of this patent is extended or adjusted under 35 U.S.C. 154(b) by 63 days.

(21) Appl. No.: 18/652,348

(22) Filed: May 1, 2024

(65) Prior Publication Data

US 2024/0369164 A1 Nov. 7, 2024

(30) Foreign Application Priority Data

May 2, 2023 (EP) .................................... 23171011

(51) Int. Cl.
*F16L 33/03* (2006.01)
*B21D 53/36* (2006.01)
(Continued)

(52) U.S. Cl.
CPC ............ *F16L 33/035* (2013.01); *B21D 53/36* (2013.01); *F16L 11/121* (2013.01)

(58) Field of Classification Search
CPC ...... F16L 33/035; F16L 11/121; B21D 53/36; F16B 2015/0076; F16B 2/241; F16B 15/003; B65D 59/00; B23C 3/00
(Continued)

(56) References Cited

U.S. PATENT DOCUMENTS

| | | | | |
|---|---|---|---|---|
| 566,544 | A | * 8/1896 | Smith | ................... F16L 3/2235 248/300 |
| 2,895,369 | A | * 7/1959 | Andersen | .................. E04G 5/08 411/466 |

(Continued)

FOREIGN PATENT DOCUMENTS

| | | |
|---|---|---|
| CN | 103313819 A | 9/2013 |
| CN | 107949964 A | 4/2018 |

(Continued)

OTHER PUBLICATIONS

Search Report issued in corresponding European Patent Application No. 23171011.2 on Oct. 26, 2023, 8 pages. (See accompanying statement of relevance filed herewith).

(Continued)

*Primary Examiner* — Muhammad Ijaz
(74) *Attorney, Agent, or Firm* — MH2 Technology Law Group, LLP

(57) ABSTRACT

Described are the fastening element of a T-shaped profile hose (e.g., made of a polymer material) in a connection arrangement, as well as the associated connection arrangement. Furthermore, a manufacturing method of the fastening element, a connection method of the connection arrangement with a setting device and the setting device with the connection arrangement are disclosed.
The fastening element may be made of one-part sheet metal construction and may comprise a rectangular bottom with a central longitudinal axis having a first surface and a second surface opposite to the first surface. Furthermore, a plurality
(Continued)

Figure 1:
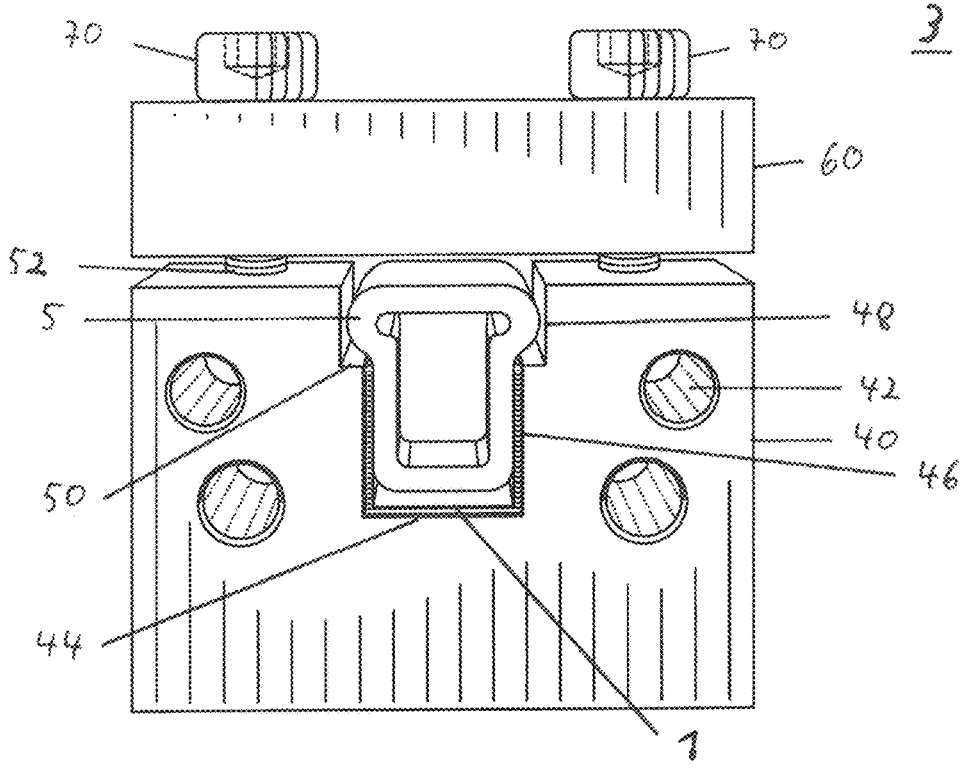

of locking teeth which project beyond the first surface on one side are adapted for penetrating into the polymer material of the T-shaped profile hose in use, and for avoiding a relative movement between fastening element and T-shaped profile hose in a direction parallel to the first surface.

14 Claims, 6 Drawing Sheets

(51) Int. Cl.
    *F16L 11/12*         (2006.01)
    *F16L 33/035*      (2006.01)

(58) Field of Classification Search
    USPC ................................................... 248/247, 300
    See application file for complete search history.

(56)                References Cited

U.S. PATENT DOCUMENTS

| | | | | |
|---|---|---|---|---|
| 2,916,159 | A * | 12/1959 | Richard | H05K 7/12 |
| | | | | 206/820 |
| 3,311,957 | A * | 4/1967 | Dunn | F16L 33/035 |
| | | | | 24/21 |
| 3,967,524 | A * | 7/1976 | Snow | F16B 15/0038 |
| | | | | 411/921 |
| 7,407,224 | B2 * | 8/2008 | Okabe | B60R 13/04 |
| | | | | 296/210 |
| 8,205,923 | B2 * | 6/2012 | Mourou | B60R 13/0206 |
| | | | | 52/716.5 |
| 9,238,556 | B2 * | 1/2016 | Kühn | B21J 15/30 |
| 9,434,323 | B2 * | 9/2016 | Huchet | F16B 2/245 |
| 11,408,541 | B2 * | 8/2022 | Joesten | F16L 21/007 |
| 2007/0108356 | A1 * | 5/2007 | Wall | E04B 1/2608 |
| | | | | 248/300 |
| 2011/0258820 | A1 * | 10/2011 | Komsitsky | F16B 5/0642 |
| | | | | 24/453 |
| 2018/0245716 | A1 * | 8/2018 | Nijdam | F16B 2/246 |
| 2021/0207645 | A1 * | 7/2021 | Hoffman | A47G 1/20 |
| 2024/0369164 | A1 * | 11/2024 | Westermann | F16B 2/241 |
| 2025/0067392 | A1 * | 2/2025 | Noonan | E04B 9/006 |

FOREIGN PATENT DOCUMENTS

| | | |
|---|---|---|
| DE | 4123970 A1 | 6/1992 |
| DE | 102005000127 A1 | 3/2007 |
| DE | 102016210799 A1 | 12/2017 |
| FR | 1031194 A | 6/1953 |
| GB | 2300183 A | 10/1996 |
| JP | 2004203605 A | 7/2004 |
| KR | 20130009708 A | 1/2013 |
| KR | 20130017096 A | 2/2013 |

OTHER PUBLICATIONS

Office Action issued in corresponding Chinese Patent Application No. 202410540482.3 on Apr. 14, 2026, 10 pages. (See accompanying statement of relevance filed herewith).

* cited by examiner

FASTENING ELEMENT OF A T-SHAPED PROFILE HOSE, CONNECTION ARRANGEMENT WITH THE FASTENING ELEMENT, SETTING DEVICE AS WELL AS MANUFACTURING AND CONNECTION METHOD

1. FIELD OF THE INVENTION

The present invention relates to a fastening element of a T-shaped profile hose out of a polymer material in a connection arrangement, a connection arrangement for connecting a T-shaped profile hose out of a polymer material with a setting device or a further T-shaped profile hose, a setting device as well as a manufacturing method of the fastening element and a connection method.

2. BACKGROUND OF THE INVENTION

Profile hoses and guide tubes for transporting T-shaped elements or parts, such as for example bolts or rivets, are screwed against one another or to a processing device, e.g. a setting device or magazine, typically with a flange connection. The T-shaped channels inside the profile hoses, guide tubes and processing devices should ideally transition in a stepless manner into one another in movement direction of the T-shaped element in order to avoid a canting of the T-shaped element at the transition points.

In the state of the art, there are different solutions for connecting a profile hose with a processing device or with a coupling for the connection with a further profile hose. By that, a metallic end piece can be glued on an end of the profile hose for fixation, the end piece having a geometry for the form-fit fixation of the profile hose in a connecting piece. Such a construction can for example be gathered from KR 2013-0009708 A.

A further state of the art solution is described in GB 2,300,183 A. The described supply conduit for conveying fastening elements comprises an inlet and an outlet orifice. Furthermore, there is a conveying duct between the inlet and the outlet orifice extending in the longitudinal direction of the supply conduit and limited by a wall. At least one guide track is provided at least partially on the wall, the guide track having higher resistance to abrasion than the wall.

DE 10 2016 210 799 A1 describes a coupling device for connecting elongated hollow bodies, e.g. profile hoses, in an assembly system. The coupling device comprises a first receiving orifice for receiving a first elongated hollow body and a second receiving orifice for receiving a second elongated hollow body. In this context, the receiving orifices are arranged relative to one another such that the first and the second elongated hollow body can be coupled with one another after being inserted into the respective receiving aperture.

A transport device for components, an adapter for being used in such a transport device as well as a method for producing such an adapter is furthermore described in DE 10 2005 000 127 A1. In case of the device for transporting components in a supply line between a stockage station and a receiving station by means of a gas-like working medium volume stream which is directed in transport direction, with a component feeder assigned to the stockage station for introducing a component to be transported into the volume stream in the supply line, an end of the supply line is fixed at the component feeder in a seat provided on the side of the feeder for this purpose. The supply line has an adapter on its end that is fixed or fixable to the component feeder. This adapter encompasses the end of the supply line in a form-fit and/or firmly bonded manner. Furthermore, the outer contour of the adapter is configured in a form-fit manner regarding the seat on the feeder side.

Another example can be found in JP 2004-203605A. Here, a supply hose for smoothly supplying a part is described, consisting of a circular and column-like part and a disc part. In addition, a corresponding fastening structure and a supply method are discussed. The part is supplied through the supply hose. A supply channel that is provided in the hose is made of a channel-like room part, through which the circular and column-like part enters, and a flat room part through which the disc part enters. Clamping elements of the supply hose are fastened to a stationary element and a tip part of a positioning bolt, which is screwed into the clamping elements, engages an outer circumferential surface of the supply hose. In the supply channel, buoyancy is created at the part by means of conveyance air so that the part can be supplied in a stable position and the conveyance hose can be securely fixed.

These solutions comprise many different compounds which have an influence on the tolerances that are present at the transition points from one profile hose to another profile hose or a setting device or processing device. The above concentric arrangement of profile hose, end piece and connecting or coupling piece particularly cause a long chain of tolerances. As a result, the T-shaped elements or parts which are to be transported in the profile hose often cant at the transition points from one profile hose to the next profile hose or from the profile hose into the setting or processing device, which leads to an undesired interruption of the process.

In order to avoid same and limit the tolerance chain, the tolerances of the end piece, which is for exampled glued on the profile hose, need to be correspondingly small. For this purpose, the end pieces are typically eroded out from a metal block. However, this approach is quite cost-intensive.

Alternative or cheaper processing methods do not provide the necessary preciseness for compensating the large production tolerances of the plastic hoses. For this reason, they are not suitable for replacing the known approach.

It is therefore the object of the present invention to provide an alternative connection arrangement with which a T-shaped profile hose can be connected more easily with a setting device or a further T-shaped profile hose, in particular with defined tolerance compensation and refined positioning of the T-shaped profile hose.

3. SUMMARY OF THE INVENTION

The above object is solved by a connection arrangement for connecting a T-shaped profile hose out of a polymer material with a setting device or a further T-shaped profile hose according to the independent claim 1, a setting device according to the independent claim 7 and a connection method for a T-shaped profile hose with a setting device or a further T-shaped profile hose by using the inventive connection arrangement according to the independent claim 8. Advantageous embodiments and further developments can be gathered from the subsequent description, the drawings as well as the appending claims.

A first inventive fastening element of a T-shaped profile hose out of a polymer material in a connection arrangement, with the fastening element consisting of a one-part sheet metal construction, comprises: a rectangular bottom with a central longitudinal axis having a first surface and a second surface opposite to the first surface, and a plurality of locking teeth which project beyond the first surface on one side and are adapted for penetrating into the polymer material of the T-shaped profile hose in use, and for avoiding a relative movement between fastening element and T-shaped profile hose in a direction parallel to the first surface.

The first inventive fastening element is used for fixing the T-shaped profile hose out of polymer material in the connection arrangement. The term T-shaped profile hose requires that the profile hose does not only have a T-shape inside, e.g. for transporting joining elements with a head and a shaft, such as screws, bolts, rivets and the like, but also has a T-shape outside in cross-section. In other words, the T-shaped profile hose does not only have a T-shape inside but also a T-shaped outer contour. This will also become clear in the course of the subsequent discussion of the inventive fastening element.

The term polymer material comprises polymer material from renewable sources as well as from non-renewable sources or fossil sources. Preferably, the polymer material is a, particularly flexible, plastic material.

Finally, it must be considered that the fastening element consists of the one-part sheet metal construction. Generally, the term sheet metal refers to a rolled product out of metal which is supplied in form of a plate and the width and length of which is very much more than its thickness. Thus, the term sheet metal emphasizes that the fastening element is made of a metal. Furthermore, is has a low material thickness. In this context, it is particularly preferred that a fine sheet metal is used for the one-part sheet metal construction of the fastening element, as particularly a fine sheet metal is characterized by the fact that it has a material thickness of not more than 3 mm.

In the following, the inventive fastening element is described based on its use in a connection arrangement. In this context, the connection arrangement comprises a basic element with a central longitudinal axis and a T-shaped recess for receiving the T-shaped profile hose. The T-shaped recess extends in longitudinal direction through the basic element and is open on an end of a head. That means that a bottom of the recess forms the end of the shaft of the T-shape which faces away from the head. In a direction perpendicular to the bottom of the recess, the adjoining sidewalls of the T-shaped recess first of all define the shaft of the T-shape and then the head of the T-shape. The T-shaped recess is open on the side of the head which faces away from the shaft, so that the T-shaped profile hose can be inserted from this side into the T-shaped recess in use.

When in use, the fastening element is thus arranged in the T-shaped recess of the basic element of the connection arrangement. In particular, the second surface of the rect-angular bottom faces a bottom of the T-shaped recess. Accordingly, the plurality of locking teeth projects beyond the first surface of the bottom in the direction of the open head end of the T-shaped recess. The T-shaped profile hose is now arranged in the connection arrangement so that an end of the T-shaped profile hose is in a flush alignment with a face side of the basic element. With regard to the later fastening to a setting device or a further connection arrange-ment with a further T-shaped profile hose, the front edge or the axial end of the profile hose therefore serves as reference edge. Due to the plurality of locking teeth, the profile hose is held in a form-fit and friction-fit manner in longitudinal direction in the basic element.

Furthermore, the connection arrangement includes a lock-ing element with which the T-shaped recess is lockable perpendicular to the longitudinal axis. The T-shaped profile hose is fixed in the recess with this locking element. This is carried out by arranging the locking element of the connec-tion arrangement at the basic element, e.g. by screwing it tight. Due to the fastening element, the head portion of the T-shaped profile hose is not flush with the basic element perpendicular to the central longitudinal axis. Rather, the T-shaped profile hose extends beyond the basic element. In other words, the fastening element which is arranged in the T-shaped recess provides for an undersize of the T-shaped recess in the direction perpendicular to the central longitu-dinal axis or in the direction of the open head end of the T-shaped recess.

When the locking element is therefore fastened at the basic element, it pushes the head portion of the T-shaped profile hose in the direction of the bottom of the T-shaped recess so that the plurality of locking teeth penetrates the material of the T-shaped profile hose and fixes same.

For fastening the connection arrangement with the T-shaped profile hose fixed in there to a setting or processing device or to a further connection arrangement with a further T-shaped profile hose fixed in there, the basic element comprises a connection means. These are preferably at least one passage bore hole, particularly preferred at least two passage bore holes. In this context, the passage bore hole extends parallel to the central longitudinal axis. Alterna-tively to the passage bore hole(s), clamps, quick releases, pins, locking connectors, bayonet locks and the like are preferred as connection means.

An advantage of this assembly is that the T-shaped profile hose which is fixed like this is intended to be fastened to a setting or processing device or to a further connection arrangement, only the tolerances in the material thickness of the T-shaped profile hose in the head portion need to be taken into consideration, which considerably facilitates a stepless guiding of the connection elements in the T-shaped profile hose. Furthermore, a reference point for the transition and the tolerance compensation between the profile hoses to be connected by means of the reference edge and the end of the head portion of the T-shaped profile hose which faces away from the shaft portion is automatically defined. More-over, this is a cost-effective solution for reducing the present tolerances, in particular when being compared with an eroded end piece of a profile hose.

Based on the above-mentioned aspects, the assembly is facilitated, as for example, the laborious gluing of the sleeves with the profile hose can be omitted. Furthermore, the tolerance chain has been shortened, as shown above, which leads to a reduction in costs and realizes a more precise positioning of the T-shaped profile hose.

In an advantageous embodiment of the fastening element, the plurality of locking teeth comprises at least one first locking tooth and at least a second locking tooth, which, with respect to the central longitudinal axis, are arranged preferably mirror-symmetrically. In connection with these embodiments, it is particularly preferred that the plurality of locking teeth of the fastening element comprises a plurality of first locking teeth and a plurality of second locking teeth, with the plurality of first locking teeth and the plurality of second locking teeth preferably being aligned parallel to the central longitudinal axis.

As when using the fastening element, the object of the locking teeth is to push the T-shaped profile hose in the direction of the locking element and to penetrate into the material of the T-shaped profile hose, at least two locking teeth are necessary, namely a first and a second locking tooth. The mirror-symmetrical arrangement of the first and the second locking teeth is particularly advantageous, as in this way, the T-shaped profile hose can be pushed as evenly as possible in the direction of the locking element.

The use of a plurality of first locking teeth and a plurality of second locking teeth allows a particularly effective retention of the T-shaped profile hose and thus the particularly effective avoiding of the mentioned relative movement. The plurality of first locking teeth and/or the plurality of second locking teeth can extend across the overall length of the bottom of the fastening element or across partial portions of same, e.g. alternating with portions without locking teeth. Particularly with a plurality of first and second locking teeth as well as with a mirror-symmetrical arrangement of same, a particularly effective avoiding of the relative movement is possible and the T-shaped profile hose is pushed over a larger portion against the locking element in the course of the fixation.

In a further advantageous embodiment of the fastening element, two sidewalls extend from the bottom which are arranged parallel and mirror-symmetrically to the central longitudinal axis, the plurality of locking teeth being arranged at an end of the sidewalls which faces away from the bottom. It is particularly advantageous that in this embodiment, the sidewalls limit the bottom laterally and that there is a plurality of apertures in a transition portion between bottom and the respective sidewall.

With this embodiment, the locking teeth can engage particularly effectively adjacent to the head portion of the T-shaped profile hose in use. Therefore, the sidewalls are preferably dimensioned so that the plurality of locking teeth project beyond the shaft portion of the T-shaped recess in the basic element of the connection arrangement. In other words, and with respect to the T-shaped profile hose, the sidewall has an extension perpendicular to the central longitudinal axis which corresponds approximately to the length of the shaft portion of the T-shaped profile hose with respect to the outer contour. By that, a particularly effective fixing of the T-shaped profile hose in the connection arrangement is realized.

The apertures in the transition portion between bottom and respective sidewall provide for a facilitated bending of the sidewalls after the fastening element in its unprocessed state has been produced. This is made clear later in connection with the production of the fastening element.

With regard to the embodiments with the sidewalls, it is furthermore preferred that at least one U-shaped recess is present in each of the sidewalls, so that a lug is provided which projects in a direction away from the central longitudinal axis and is connected to the sidewall on one side, with the open end of the U-shaped recess preferably facing in the direction of the end of the respective sidewall which faces away from the bottom. The U-shaped recess in the sidewalls is particularly preferred when the sidewalls laterally limit the bottom of the fastening element in a lateral direction. In use, the sidewalls of the fastening element then directly abut the sidewalls of the T-shaped recess in the basic element of the connection arrangement. The lugs formed in the fastening element can be bent to the outside. This requires a corresponding recess being present in the respective sidewall of the T-shaped recess of the basic element of the connection arrangement. Thus, the fastening element is secured against a relative movement in the connection arrangement or in the basic element of the connection arrangement, respectively, in particular in the longitudinal direction.

In a further preferred embodiment of the fastening element, the bottom has at least one passage hole, preferably two passage holes, preferably on the central longitudinal axis, and/or the bottom has at least one lug projecting beyond the second surface on one side. Both alternatives provide a fixation of the fastening element in the T-shaped recess of the basic element of the connection arrangement. By this means, the fastening element is also secured against a relative movement with respect to the basic element.

A second inventive fastening element of a T-shaped profile hose out of a polymer material in a connection arrangement, with the fastening element being made of a one-part sheet metal construction, comprises: a rectangular basic surface with a central longitudinal axis which comprises a first surface as well as a second surface facing the first surface, which defines a plane containing the central longitudinal axis, and comprises a fastening means for fastening the fastening element in the connection arrangement, and a plurality of locking teeth which are arranged in a first direction in the plane that is defined by the rectangular basic surface and are adapted, so as to penetrate in use into the polymer material of the T-shaped profile hose and prevent a relative movement between fastening element and T-shaped profile hose in a direction parallel to the central longitudinal axis, with the first direction being aligned perpendicular to the central longitudinal axis. The second inventive fastening element distinguishes from the above-described first inventive fastening element by not having a bottom. The resulting function is, however, the same as the function described above for the first inventive fastening element, so that reference is made to the corresponding remarks in order to avoid repetitions. The same applies to the choice of material for the fastening element and the material thickness. It is furthermore preferred that two of these fastening elements are arranged on opposite sides in the T-shaped recess.

In a preferred embodiment of the fastening element, same comprises as fastening means at least a U-shaped recess, so that a lug is provided which projects into one direction from the plane that is defined by the basic surface and is connected with the rectangular basic surface on one side, wherein the open end of the U-shaped recess preferably shows in the first direction, and/or a bore hole. In this way, the fastening element can be fastened particularly effectively against a relative movement along the central longitudinal axis in the connection arrangement, in particular in the T-shaped recess in the basic element.

An inventive connection arrangement for connecting a T-shaped profile hose out of a polymer material with a setting device or a further T-shaped profile hose comprises a basic element with a central longitudinal axis having a connecting means for fastening the basic element to the setting device or a further connection arrangement of a further T-shaped profile hose, and the basic element comprises a T-shaped recess for receiving the T-shaped profile hose, which extends in longitudinal direction through the basic element and is open at a head end, a locking element with which the T-shaped recess can be closed perpendicular to the longitudinal axis, as well as the first inventive fastening element which is arranged in the T-shaped recess, in particular adjacent to a bottom of the T-shaped recess, or two of the second inventive fastening elements which are arranged on opposite sides in the T-shaped recess, or the T-shaped recess includes a plurality of locking teeth integrally configured with same, which project in particular from a step formed by the T-shaped recess in the direction of the locking element and are arranged parallel to a central longitudinal axis of the basic element. The inventive connection arrangement uses the first or the second inventive fastening element. With regard to the technical effects, reference is therefore made to the above remarks regarding the inventive fastening elements so as to avoid repetitions. Alternatively, the basic element of the connection arrangement itself comprises the plurality of locking teeth so that the fastening of the fastening element in the basic element can be omitted. In this case, however, the production of the basic element is more laborious. The functionality during operation is, however, similar to the function during the use of the fastening element.

Preferably, the connecting means is at least one passage bore hole extending parallel to the longitudinal axis in the basic element, particularly preferred at least two passage bore holes. As an alternative to the one or more passage bore holes, clamps, quick-lock fasteners, pins, locking connectors, bayonet locks and the like are preferred as connecting means.

In a preferred embodiment of the connection arrangement with one of the fastening elements, the central longitudinal axis of the fastening element and the central longitudinal axis of the basic element are aligned parallel to one another. Due to this alignment, the plurality of locking teeth also extends parallel to the central longitudinal axis, in particular when using a plurality of first and a plurality of second locking teeth, and enables a particularly advantageous fixing of the T-shaped profile hose in the connection arrangement, as discussed above.

It is of advantage when the corresponding fastening element is connected to the bottom and/or the sidewalls of the T-shaped recess in the basic element of the connection arrangement in a way that it is secured against a relative movement to the basic element along the central longitudinal axis, in particular by means of a form-fit connection, particularly preferred by means of screwing or dowelling. The connection between fastening element and bottom and/or sidewall of the T-shaped recess can take place via the passage hole or the passage holes in the bottom of the fastening element and/or through the at least one lug which engages a corresponding recess in the bottom of the basic element. Alternatively, and in particular with regard to the second inventive fastening element, the connection can take place via the fastening means with the sidewall of the T-shaped recess. In doing so, the fastening element is secured against a relative movement in the T-shaped recess of the basic element of the connection arrangement along the central longitudinal axis, as discussed above. A screwing additionally provides a fixing perpendicular to the central longitudinal axis and in particular to the bottom of the T-shaped recess in the basic element.

Preferably, the T-shaped recess comprises indentations in the basic element of the connection arrangement at the sidewalls, so as to secure the fastening element in the T-shaped recess against a relative movement to the basic element along the central longitudinal axis. The indentations at the sidewalls of the T-shaped recess in the basic element were discussed above in connection with the lugs that are formed in the sidewalls of the fastening element. Thus, this configuration realizes a further securing against a relative movement between fastening element and basic element.

It is likewise preferred that in the T-shaped recess, a T-shaped profile hose is arranged and a central longitudinal axis of the T-shaped profile hose as well as the central longitudinal axis of the basic element are arranged parallel to one another in the connection arrangement. Thus, all central longitudinal axes, i.e. that of the fastening element, that of the basic element and that of the T-shaped profile hose, are arranged parallel to one another. The plurality of locking teeth therefore extends preferably also parallel to the central longitudinal axis, thereby particularly effectively preventing a relative movement between fastening element and T-shaped profile hose along the central longitudinal axis.

In a further embodiment of the connection arrangement, the basic element and/or the locking element is/are made of aluminum or steel. In the production of the connection arrangement out of aluminum or steel, the required tolerances can be realized particularly effectively, particularly in comparison to the production out of a plastic material.

An inventive setting device is connected with a T-shaped profile hose out of a polymer material by means of the inventive connection arrangement. The inventive setting device uses/is in contact with the inventive connection arrangement. Therefore, in order to avoid repetitions, reference is again made to the above remarks both regarding the inventive fastening element as well as the inventive connection arrangement.

An inventive manufacturing method of the inventive fastening element comprises the following steps: providing a sheet metal material, processing the sheet metal material, in particular by means of etching so that the fastening element is available in an unprocessed state, subsequently bending the portions of the fastening element with the plurality of locking teeth so that same project on one side beyond the first surface. The inventive fastening element is manufactured with the inventive manufacturing method. Due to the preferred etching from the provided sheet metal, the fastening element can be manufactured particularly cost effectively. In addition, a plurality of apertures can be made in the transition portion between bottom and sidewalls with the corresponding embodiment so as to facilitate the later bending of the sidewalls with respect to the bottom. With regard to the inventive configuration of the fastening element without bottom, i.e. the second inventive alternative of the fastening element, the corresponding manufacturing method comprises the following steps: providing a sheet metal material and processing the sheet metal material, in particular by means of etching, so that the fastening element is available. In comparison with the first inventive embodiment, no bending of the portions of the fastening element with the plurality of locking teeth is thus necessary.

For the sake of completeness and with respect to the configuration of the basic element of the connection arrangement with the plurality of locking teeth, a corresponding manufacturing method comprises the steps: providing a basic element with a central longitudinal axis with the basic element comprising a T-shaped recess for receiving the T-shaped profile hose extending in longitudinal direction through the basic element and being open on a head end, inserting, in particular by means of milling, a plurality of locking teeth in the portion of a step of the T-shaped recess as well as removing material in the portion of the step of the T-shaped recess so that the plurality of locking teeth projects beyond the step. The removing of the material can also take place by means of milling. Advantageously, in the course of the manufacturing method, the basic element is also provided with a connecting means so as to be able to fasten the basic element to a setting device or a further connection arrangement of another T-shaped profile hose. Preferably, this is at least one passage bore hole, particularly preferred at least two passage bore holes. In this context, the passage bore hole extends parallel to the central longitudinal axis. Alternatively to the passage bore hole(s), clamps, quick releases, pins, locking connectors, bayonet locks and the like are preferred as connection means.

An inventive connection method for a T-shaped profile hose with a setting device or a further T-shaped profile hose by using the inventive connection arrangement comprises the steps: providing the T-shaped profile hose as well as the inventive connection arrangement and arranging the inventive fastening element in the T-shaped recess in the basic element of the connection arrangement or providing the T-shaped profile hose as well as the inventive connection arrangement with the plurality of locking teeth which are formed integrally with T-shaped recess, after that, arranging the T-shaped profile hose in the connection arrangement such that an end of the T-shaped profile hose is aligned flush with a face side of the basic element, fixing the T-shaped profile hose in the T-shaped recess by arranging the locking element in the connection arrangement at the basic element causing the plurality of locking teeth to penetrate the T-shaped profile hose, preferably adjacent to a bottom side of the head of the T-shaped profile hose and after that, connecting the fixed T-shaped profile hose with the setting device or a further T-shaped profile hose, in particular a further T-shaped profile hose that is fixed in an inventive connection arrangement. The inventive connection method uses the inventive connection arrangement and has already been discussed above in connection with the inventive fastening element as well as the inventive connection arrangement. Therefore, reference is made to the corresponding explanations.

4. SHORT DESCRIPTION OF THE DRAWINGS

In the following, the present invention will be described in detail with reference to the drawings.

Figure 2:
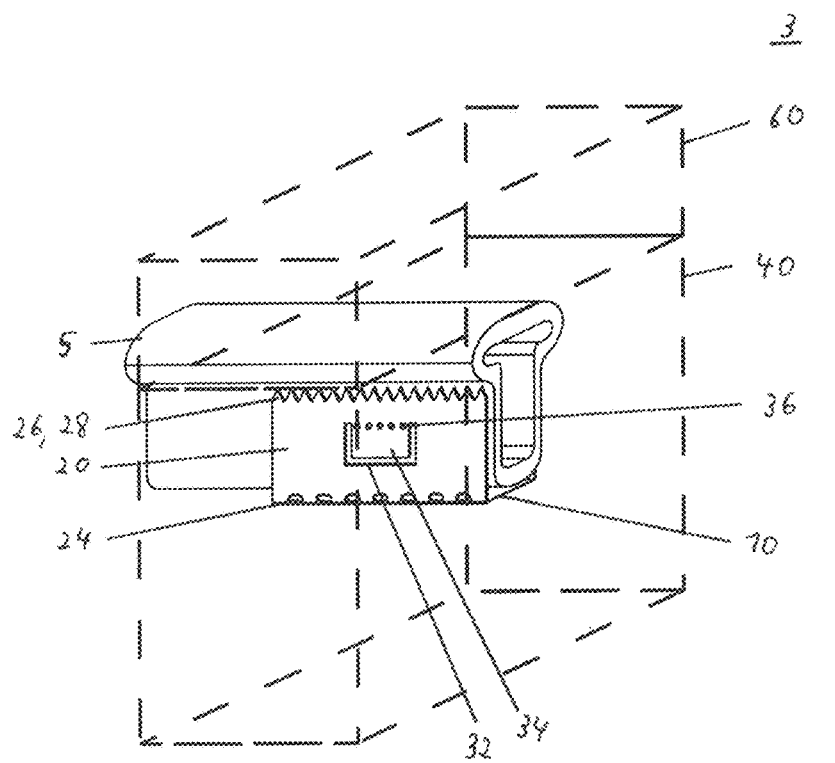
Figure 3:
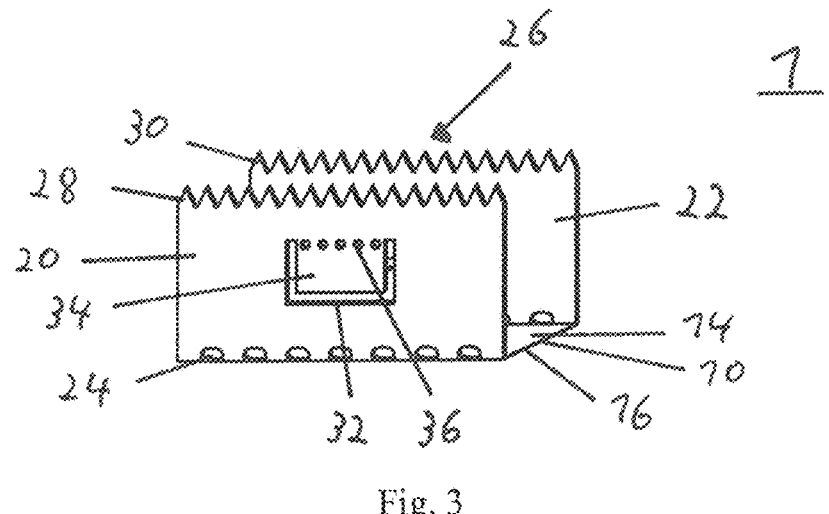
Figure 4:
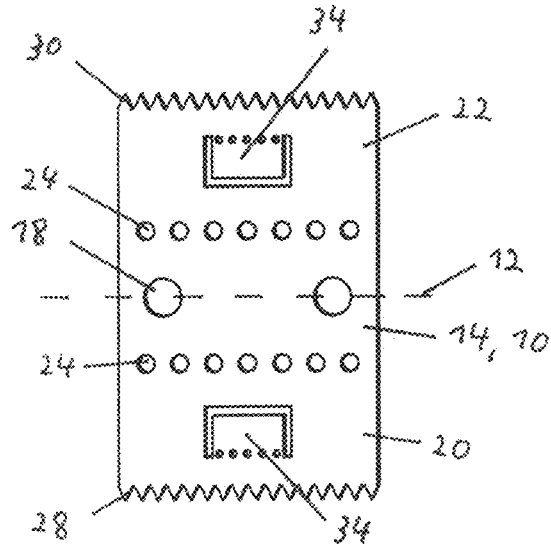
Figure 5:
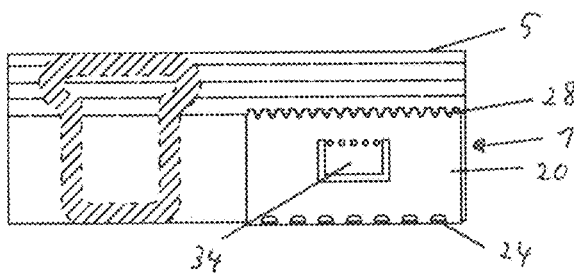
Figure 6:
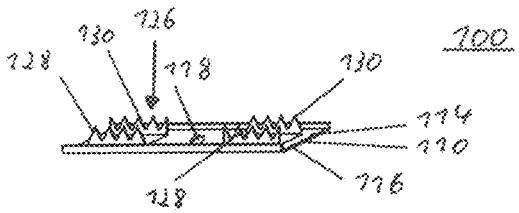
Figure 7:
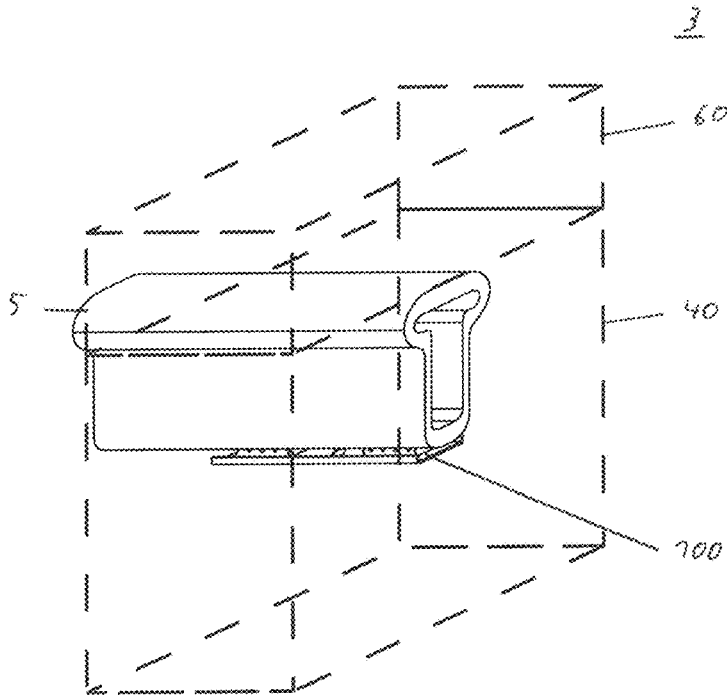
Figure 8:
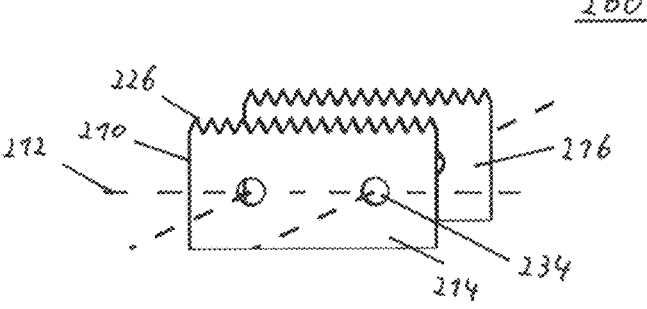
Figure 9:
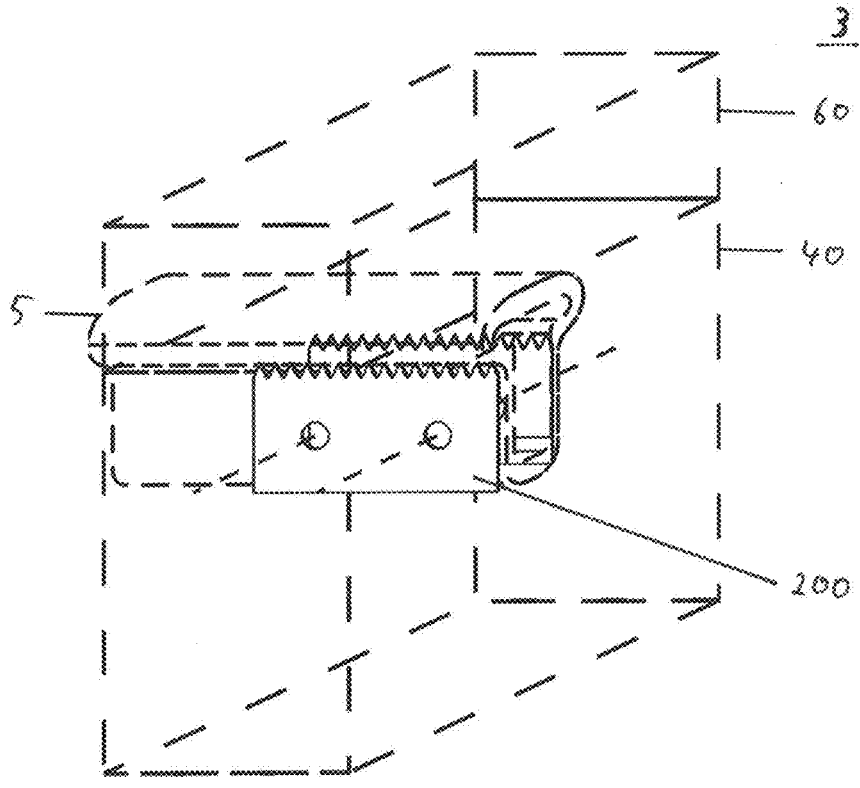
Figure 10:
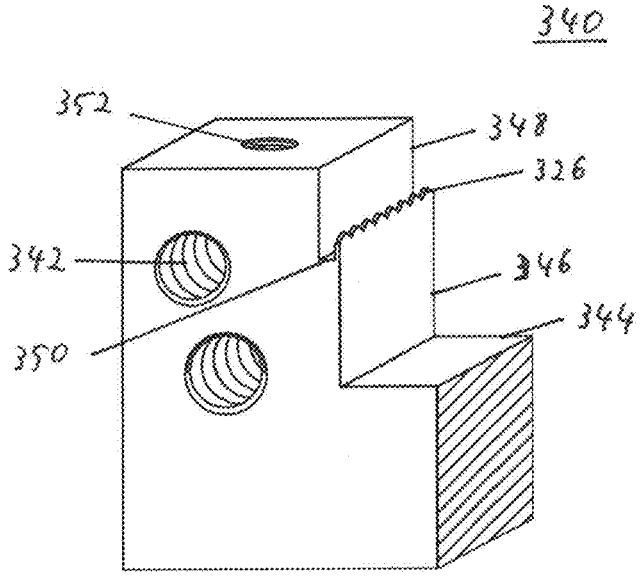
Figure 11:
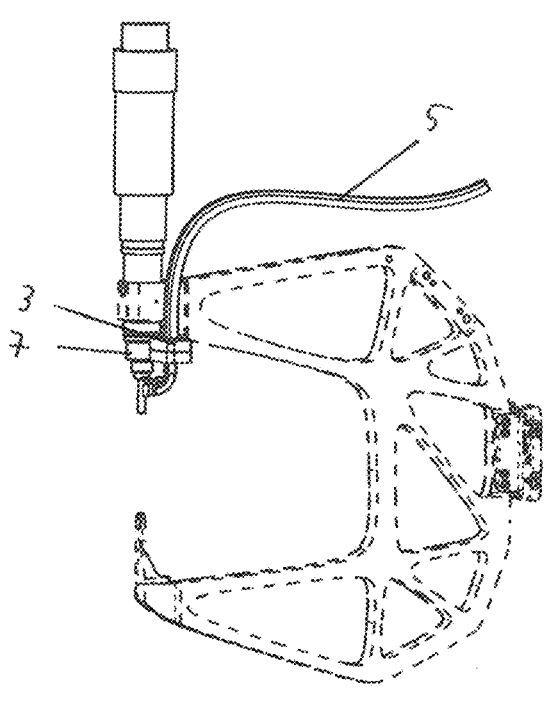
Figure 12:
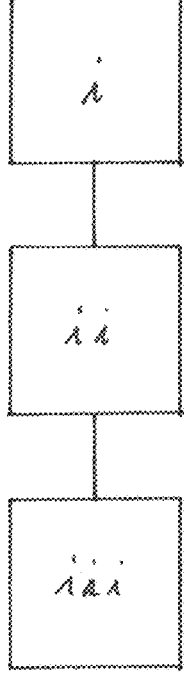
Figure 13:
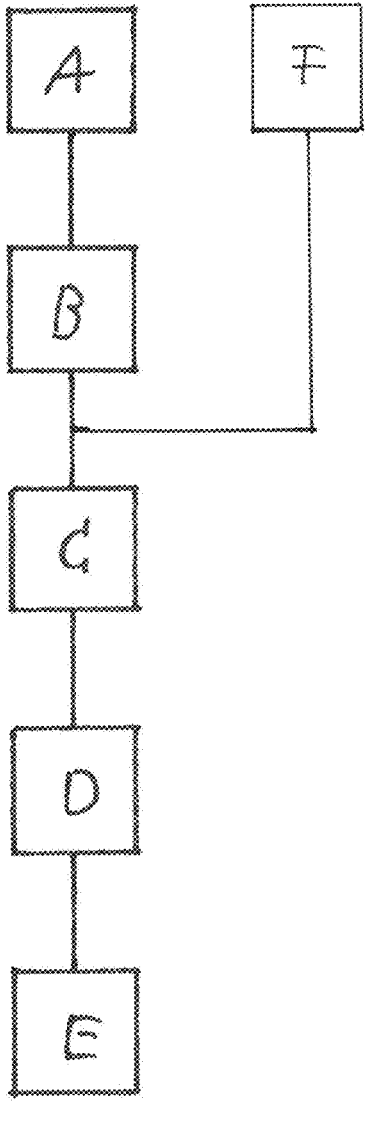

In the drawings, the same reference signs denote the same components and/or elements. They show:

FIG. 1 a lateral view of an embodiment of the inventive connection arrangement with a first embodiment according to the first alternative of the inventive fastening element, FIG. 2 a perspective view of the connection arrangement according to FIG. 1, with only the outlines of the components of the connection arrangement being illustrated, FIG. 3 a perspective view of the first embodiment of the inventive fastening element, FIG. 4 a top view on the fastening element according to FIG. 3 in the unprocessed state, i.e. after the processing of the sheet metal material but before the bending, FIG. 5 a schematic lateral view of the first embodiment of the inventive fastening element when being used with a T-shaped profile hose, FIG. 6 a perspective view of a second embodiment of the first alternative of the inventive fastening element, FIG. 7 a perspective view of an embodiment of the inventive connection arrangement with the second embodiment of the first alternative of the inventive fastening element, with only outlines of the components of the connection arrangement being illustrated, FIG. 8 a perspective view of an embodiment according to the second alternative of the inventive fastening element, FIG. 9 a perspective view of the connection arrangement according to FIG. 1 with the fastening element according to FIG. 8, with only outlines of the components of the connection arrangement being shown, FIG. 10 a perspective sectional view of an alternative configuration of the basic element of the connection arrangement, FIG. 11 a perspective view of a setting device with the connection arrangement, FIG. 12 a schematic course of the procedure of an embodiment of an inventive manufacturing method and FIG. 13 a schematic course of the procedure of an embodiment of an inventive connection method.

5. DETAILED DESCRIPTION OF THE PREFERRED EMBODIMENTS

First of all, a first embodiment of a fastening element 1 is discussed with reference to FIGS. 1 to 5. In this context, the FIGS. 1, 2 and 5 illustrate the use of the fastening element 1 in connection with a T-shaped profile hose 5 out of a polymer material as well as with respect to a connection arrangement 3.

The term T-shaped profile hose 5 requires the profile hose 5 to not only have a T-shape inside, e.g. for transporting joining elements with a head and a shaft, such as screws, bolts, rivets and the like, but to also have a T-shape outside in cross section. In other words, in cross section, the T-shaped profile hose 5 does not only have a T-shape inside but also has a T-shaped outer contour.

The term polymer material comprises polymer material out of renewable sources as well as of non-renewable or fossil sources. Preferably, the polymer material is a, in particular flexible, plastic material.

According to FIG. 1, the connection arrangement 3 comprises a basic element 40. It has a cuboidal configuration. Furthermore, the basic element 40 has a T-shaped recess 44 for receiving the T-shaped profile hose 5. The T-shaped recess 44 extends along a central longitudinal axis of the basic element 40 through the basic element 40. A bottom of the T-shaped recess 44 forms the end of the shaft of the T-shape which faces away from the head. In the common way, the T-shape thus comprises a shaft portion 46 and a head portion 48, which are separated from one another by means of the step 50. The shaft portion 46 has a smaller extension transverse to the longitudinal axis in comparison with the head portion 48. Ideally, in terms of its size, the T-shaped recess 44 is adapted to the T-shaped profile hose 5 to be received. The T-shaped recess 44 is configured open at its head end, i.e. adjacent to the head portion 48 at the end opposite to the shaft portion 46. Thus, in use, the T-shaped profile hose 5 can be inserted into the T-shaped recess 44 from this side.

In use, firstly, the fastening element 1 is arranged in the T-shaped recess 44 of the basic element 40 of the connection arrangement 3. For this reason, firstly the construction of the fastening element 1 as well as the production of same is explained. The fastening element 1 is made of an integral sheet metal construction. Generally, the term sheet metal refers to a rolling mill product out of metal, which is delivered in form of a plate and the width and length of which is much larger than its thickness. Therefore, the term sheet metal construction emphasizes that the fastening element 1 is made of a metal. Furthermore, it has a low material thickness. In this context, it is particularly preferred when a fine sheet metal is used for the integral sheet metal construction of the fastening element 1, because a fine sheet metal in particular is characterized in having a material thickness of not more than 3 mm.

In the course of the production of the fastening element 1, the sheet metal is therefore first of all provided and subsequently processed such that the fastening element 1 is present in an unprocessed state. This unprocessed state is shown in FIG. 4. The processing takes place for example by means of etching, in particular laser etching.

As can be seen in FIG. 4, the fastening element 1 in the unprocessed state is arranged in a plane. A bottom 10 as well as the central longitudinal axis 12 can be recognized here.

Furthermore, a first surface 14 of the bottom 10 can be recognized. A first sidewall 20 as well as a second sidewall 22, which is opposite to the first sidewall 20, adjoin the bottom 10. Furthermore, the bottom 10 comprises two passage holes 18.

In the transition portion between bottom 10 and first 20 or second sidewall 22, a plurality of apertures 24 is provided. They serve for the easier bending of the sidewalls, so that the shape according to FIG. 3 arises. In the course of this embodiment, the sidewalls preferably enclose a vertical angle, though this is not absolutely necessary.

A plurality of locking teeth 26 is provided at the end of each sidewall 20, 22, the end facing away from the bottom 10. Thus, the first sidewall 20 comprises a first plurality of locking teeth 28 and the second sidewall 22 includes a second plurality of locking teeth 30.

Furthermore, each sidewall comprises a U-shaped recess 32 which forms a lug 34 in the sidewall. Thus, the lug 34 is connected with the respective sidewall 22, 20 on one side, preferably on an end which faces the plurality of locking teeth 26. As in use, the lug 34 should also be bent with respect to the sidewalls 20, 22, a plurality of apertures 36 is also present in the transition portion between lug 34 and first 20 or second sidewall 22.

Again with reference to FIG. 1, the fastening element 1 is inserted into the T-shaped recess 44 in a first step. Here, the second surface 16 of the bottom 10 faces a bottom of the T-shaped recess 44. Thus, the plurality of locking teeth 26 projects in the direction of the open head end of the T-shaped recess 44 beyond the first surface 14 of the bottom 10. In the illustrated embodiment, particularly the plurality of locking teeth 26 extends beyond the step 50. Due to the dimensioning of the fastening element 1, a slight undersize for the profile hose 5 thus arises as a result in the T-shaped recess 44.

The T-shaped profile hose 5 is now arranged in the connection arrangement 3 such that an end of the T-shaped profile hose 5 is aligned flush with a face side of the basic element 40. In the illustrated example, this is the shown face side. The front edge of the T-shaped profile hose 5 thus serves as a reference edge. Due to the plurality of locking teeth 26, the profile hose is arranged in the T-shaped recess 44 so that it is not flush with the upper side of the basic element 40. In this context, the upper side refers to the side at which the T-shaped recess 44 is open.

In order to fix the T-shaped profile hose 5 in the connection arrangement 3 or the basic element 40, the connection arrangement 3 furthermore comprises a locking element 60. It is adapted to the upper side of the basic element 40 in terms of its shape and covers the T-shaped recess 44. A fixation of the locking element 60 takes place by means of screws 70, which are screwed into corresponding bore holes 52 at the upper side of the basic element 40. By that, the T-shaped profile hose 5 is pressed into the T-shaped recess 44, so that the plurality of locking teeth 26 enters or penetrates the polymer material of the T-shaped profile hose 5. As soon as the locking element 60 is screwed together with the basic element 40 and the T-shaped recess 44 is circumferentially closed, the plurality of locking teeth 26 press themselves elastically and/or plastically into the material of the T-shaped profile hose 5, so that same abuts the locking element 60 on the side of the head.

In this way, the T-shaped profile hose 5 is secured against a relative movement with respect to the fastening element 1 in central longitudinal direction. In order to prevent a movement of the profile hose 5 together with the fastening element 1, the fastening element 1 is preferably connected with the bottom of the T-shaped recess 44 by means of the passage holes 18. This can be carried out by means of screwing or dowelling. Alternatively to the passage holes 18, a lug can also be provided which projects beyond the second surface 16 of the bottom 10 and engages into a corresponding indentation in the T-shaped recess 44, in particular in the bottom of the T-shaped recess 44.

Alternatively or in addition to that, the lugs 34 can also contribute to a fixation of the fastening element 1 in longitudinal direction in the T-shaped recess 44. For this purpose, the lugs 34 are bent to the outside so that they can engage into corresponding indentations in the sidewall in the shaft portion 46 of the T-shaped recess 44.

The connection arrangement 3 which is provided in this way can now be fastened with a setting device or a further connection arrangement with T-shaped profile hose 5 fixed in there. A corresponding fastening takes place by means of the passage bore holes 42, which are provided in the basic element 40, as connecting means. In the illustrated embodiment, the basic element 40 comprises four passage bore holes 42 as connecting means. Alternatively to the passage bore holes 42, clamps, quick lock fasteners, pins, locking connectors, bayonet locks and the like are preferred as connection means.

The basic element 40 and/or the locking element 60 are made of aluminum or steel. When producing the connection arrangement 3 out of aluminum or steel, the required tolerances in particular can be realized effectively, in particular in comparison to the production out of a plastic material.

In summary, movements of the T-shaped profile hose 5 are avoided as the plurality of locking teeth 26 are formed into the polymer material of the T-shaped profile hose 5. For this purpose, the fastening element 1 must be held force-fit and/or form-fit in the basic element 40. In addition, the plurality of locking teeth 26 causes a spring effect due to its tapered shape in combination with the elastic material of the T-shaped profile hose 5, which is of advantage in particular in case of movable processing devices or setting devices.

FIG. 5 clarifies the interaction or arrangement, respectively, of the profile hose 5 in the fastening element 1, with a top view on the cross section of the profile hose present in the left half of the illustration for the better comprehensibility of the drawn-in outlines.

A second embodiment of the fastening element 100 is shown in FIGS. 6 and 7. This fastening element 100 differs from the first embodiment of the fastening element 1 in that the plurality of locking teeth 126 is arranged on the bottom 10 without sidewalls. Apart from that, the construction corresponds to the construction discussed before.

This means that this fastening element 100 also comprises a bottom 110 with a first 114 and a second surface 116. The plurality of locking teeth 126 projects beyond the first surface 114, with a first plurality 128 and a second plurality of locking teeth 130 being provided. Unlike the first embodiment of the fastening element 1, the plurality of first locking teeth 128 and the plurality of second locking teeth 130 does not extend across the complete length of the fastening element but across partial portions of same. In particular, the first and the second plurality of locking teeth 128, 130 are present in alternation with portions without locking teeth. A passage hole 118 is present centrally in the bottom 110 of the fastening element 100 for fastening the fastening element 100 in the T-shaped recess 44 in the basic element 40.

Due to the different arrangement of the plurality of locking teeth 126, same do not engage into the polymer material adjacent to the head portion of the T-shaped profile hose 5 in use, but rather penetrate, adjacent to a bottom end of the T-shaped profile hose 5, into same. This can for example be seen in FIG. 7. In this embodiment, the T-shaped profile hose 5 is not lifted out that much from the T-shaped recess 44 in the basic element 40 so that the fixation in longitudinal direction is not as strong as in comparison with the first embodiment.

With regard to FIGS. 8 and 9, an embodiment of a second alternative of the inventive fastening element 200 is explained. Same is also made of an integral sheet metal construction and comprises a rectangular basic surface 210 with a central longitudinal axis 212, which comprises a first surface 214 as well as a second surface 216 opposite to the first surface 214. The basic surface 210 defines a plane which comprises the central longitudinal axis 212. Furthermore, a fastening means is provided for fastening the fastening element 200 in the connection arrangement 3. In the illustrated embodiment, this is two bore holes 234. In this way, the fastening element 200 is fastenable to a sidewall in the T-shaped recess 44 of the basic element 40.

Furthermore, the fastening element 200 comprises a plurality of locking teeth 226 which are arranged in the plane that is defined by the rectangular basic surface 210 in a first direction and which are adapted for penetrating in use the polymer material of the T-shaped profile hose 5 and for preventing a relative movement between fastening element 200 and T-shaped profile hose 5 in a direction parallel to the central longitudinal axis 212. As can be seen in the illustration, the first direction in the plane is aligned perpendicular to the central longitudinal axis 212. For the sake of completeness, the normal to the plane defined by the basic surface 210 has also been drawn in in the portion of the bore holes 234.

The fastening element 200 differs from the above-described fastening elements 1; 100 in that it does not comprise a bottom. However, the resulting function is, with regard to the function described above for the fastening elements 1; 100, the same so that reference is made to the corresponding remarks in order to avoid repetitions. As can be taken from the illustrations of FIGS. 8 and 9, it is particularly preferred that two of these fastening elements 200 are arranged at opposite sides in the T-shaped recess 44.

Alternatively or additionally to the bore holes 234 as connecting means, at least one U-shaped recess can be provided analogously to the fastening element 1 so that a lug is provided which projects in one direction over the plane that is defined by the basic surface 210 and is connected with the rectangular basic surface 210 on one side. The open end of the U-shaped recess preferably shows into the first direction. In this way, the fastening element 200 can be fastened particularly effectively against a relative movement along the central longitudinal axis 212 in the connection arrangement 3, in particular in the T-shaped recess 44 in the basic element 40.

FIG. 10 shows a further possibility for realizing the fixation of the profile hose 5 in the connection arrangement 3. The modified basic element 340 which is shown in a perspective and partial view comprises a plurality of locking teeth 326 integrally configured with same. The locking teeth 326 are formed in the portion of the step 350 for example by means of milling.

After that, the material of the step 350 between the head portion 348 and the plurality of locking teeth 326 was removed, e.g. also by means of milling. Apart from that, the construction of the basic element 340 corresponds to the construction of the basic element 40. An advantage of this configuration is that no separate fastening element is necessary for fixing the profile hose 5 in the connection arrangement 3. The laborious manufacturing method for the base element 340 is however a disadvantage.

For the sake of completeness, FIG. 11 shows the construction out of setting device 7 and the connection arrangement 3 for connecting the profile hose 5 with the setting device 7.

With reference to FIG. 12, an embodiment of a manufacturing method is now explained. In a first step i, providing a sheet metal material takes place. Subsequently, in step ii, a processing, in particular by means of etching, of the sheet metal material takes place, so that the fastening element 1; 100 according to one of the above-described embodiments in particular, is present in an unprocessed state. Finally, the portions of the fastening element 1; 100 with the plurality of locking teeth are bent in step iii, so that same project on one side beyond the first surface.

With regard to the configuration of the fastening element 200, the corresponding manufacturing method comprises the following steps: providing a sheet metal material and processing the sheet metal material, in particular by means of etching, so that the fastening element 200 is present. Hence, in comparison with the first embodiment, no bending of the portions of the fastening element 200 with the plurality of locking teeth 226 is necessary.

For the sake of completeness and with respect to the configuration of the basic element 340 of the connection arrangement 3 with the plurality of locking teeth 326, a corresponding manufacturing method comprises the steps: providing a basic element 340 with a central longitudinal axis, with the basic element comprising a T-shaped recess 344 for receiving the T-shaped profile hose 5, with the T-shaped recess 344 extending in longitudinal direction through the basic element 340 and being open on a head end 348. After that, an inserting, in particular by milling, of the plurality of locking teeth 326 in the portion of the step 350 of the T-shaped recess 344 as well as the removing of material in the portion of the step 350 of the T-shaped recess 344 takes place so that the plurality of locking teeth 326 projects beyond the step 350. The removing of the material can also be carried out by means of milling. Advantageously, in the course of the manufacturing method, the basic element 340 is also provided with a connecting means so as to be able to fasten the basic element 340 to a setting device 7 or a further connection arrangement of a further T-shaped profile hose. This is preferably at least one passage bore hole 342, particularly preferred preferably at least two passage bore holes 342. In this context, the passage bore hole 342 extends parallel to the central longitudinal axis. Alternatively to the passage bore hole(s), clamps, quick lock fasteners, pins, locking connectors, bayonet locks and the like are preferred as connection means. As described above, the basic element 340 also includes a bore hole 352 for fastening the locking element 60.

Finally and with respect to FIG. 13, an embodiment of a connection method by using the connection arrangement 3 is explained. In a first step A, the T-shaped profile hose 5 as well as the connection arrangement 3 and the associated fastening element 1; 100; 200 are provided. Now, in step B, the fastening element 1; 100; 200 is arranged in the T-shaped recess 44 in the basic element 40 of the connection arrangement 3. Alternatively to the steps A and B, a providing of the T-shaped profile hose 5 as well as of the connection arrangement 3 with the basic element 340, which comprises the plurality of locking teeth 340, which are formed integrally with the T-shaped recess 344, takes place in step F. In step C, an arranging of the T-shaped profile hose 5 in the connection arrangement 3 takes place such that an end of the T-shaped profile hose 5 is flush with a face side of the basic element 40. After that, in step D, the T-shaped profile hose 5 is fixed in the T-shaped recess 44 by arranging the locking element 60 of the connection arrangement 3 to the basic element 40, causing the plurality of locking teeth 26; 126 to enter into the T-shaped profile hose 5, preferably adjacent to a bottom side of the head of the T-shaped profile hose 5. After that, the fixed T-shaped profile hose 5 is connected with the setting device or a further T-shaped profile hose in step E, in particular with a further T-shaped profile hose 5 that is fixed in a connection arrangement 3.

6. LIST OF REFERENCE SIGNS

1 fastening element (1st embodiment)
3 connection arrangement
5 profile hose
7 setting device
10 bottom
12 central longitudinal axis
14 first surface
16 second surface
18 passage bore hole in the bottom
20 first sidewall
22 second sidewall
24 apertures in the transition portion between bottom and first or second sidewall
26 plurality of locking teeth
28 first plurality of locking teeth
30 second plurality of locking teeth
32 U-shaped recess
34 lug
36 apertures in the transition portion between lug and first or second sidewall
40 basic element
42 passage bore hole
44 T-shaped recess
46 shaft portion
48 head portion
50 step
52 bore holes
60 locking element
70 screw
100 fastening element (2nd embodiment)
110 bottom
114 first surface
116 second surface
118 passage bore hole in the bottom
126 plurality of locking teeth
128 first plurality of locking teeth
130 second plurality of locking teeth
200 fastening element (3rd embodiment)
210 basic surface
212 central longitudinal axis
214 first surface
216 second surface
226 plurality of locking teeth
234 bore hole in the basic surface
326 plurality of locking teeth
340 basic element
342 passage bore hole
344 T-shaped recess
346 shaft portion
348 head portion
350 step
352 bore hole

16

The invention claimed is:

1. A connection arrangement for connecting a T-shaped profile hose made out of a polymer material with a setting device or a further T-shaped profile hose, with the connection arrangement comprising:
   a) a basic element with a central longitudinal axis having a connecting means for fastening the basic element to the setting device or a further connection arrangement of a further T-shaped profile hose, wherein the basic element comprises a T-shaped recess for receiving the T-shaped profile hose, which extends in a longitudinal direction through the basic element and is open at a head end,
   b) a locking element with which the T-shaped recess is closable perpendicular to the longitudinal axis, and
   c) a fastening element consisting of a one-part sheet metal construction, and the fastening element comprising: a rectangular bottom with a central longitudinal axis having a first surface and a second surface opposite to the first surface, and a plurality of locking teeth which project beyond the first surface on one side and are adapted for penetrating into the polymer material of the T-shaped profile hose in use, and for avoiding a relative movement between fastening element and the T-shaped profile hose in a direction parallel to the first surface, wherein the fastening element is arranged in the T-shaped recess.

2. The connection arrangement according to claim 1 wherein the central longitudinal axis of the fastening element and the central longitudinal axis of the basic element are aligned parallel to one another.

3. The connection arrangement according to claim 1, wherein the fastening element is connected to a bottom and/or one or more sidewalls of the T-shaped recess in the basic element such that the fastening element is secured against a movement relative to the basic element along the central longitudinal axis.

4. The connection arrangement according to claim 1, wherein the T-shaped recess comprises indentations in the basic element at one or more sidewalls, so as to secure the fastening element in the T-shaped recess against a relative movement to the basic element along the central longitudinal axis.

5. The connection arrangement according to claim 1, wherein in the T-shaped recess, a T-shaped profile hose is furthermore arranged and a central longitudinal axis of the T-shaped profile hose and the central longitudinal axis of the basic element are arranged parallel to one another in the connection arrangement.

6. The connection arrangement according to claim 1, wherein the basic element and/or the locking element is/are made of aluminum or steel.

7. A setting device which is connected with a T-shaped profile hose made out of a polymer material by means of the connection arrangement according to claim 1.

8. A connection method for connecting a T-shaped profile hose with a setting device or a further T-shaped profile hose by using the connection arrangement according to claim 1, the method comprising:
   a) providing the T-shaped profile hose and the connection arrangement according to claim 1,
   b) arranging the fastening element in the T-shaped recess in the basic element of the connection arrangement,
   c) arranging the T-shaped profile hose in the connection arrangement such that an end of the T-shaped profile hose is aligned flush with a face side of the basic element, d) fixing the T-shaped profile hose in the T-shaped recess by arranging the locking element of the connection arrangement to the basic element, causing the plurality of locking teeth to penetrate the T-shaped profile hose, and e) connecting the fixed T-shaped profile hose with the setting device or a further T-shaped profile hose.

9. The connection arrangement according to claim 1, wherein the plurality of locking teeth comprises at least a first locking tooth and at least a second locking tooth.

10. The connection arrangement according to claim 9, wherein the plurality of locking teeth comprises a plurality of first locking teeth and a plurality of second locking teeth.

11. The connection arrangement according to claim 1, wherein two sidewalls extend from the rectangular bottom which are arranged parallel and mirror-symmetrically to the central longitudinal axis and where the plurality of locking teeth are arranged at an end of the two sidewalls which faces away from the rectangular bottom.

12. The connection arrangement according to claim 11, wherein the sidewalls limit the rectangular bottom laterally and wherein there is a plurality of apertures in a transition portion between the rectangular bottom and the respective sidewall.

13. The connection arrangement according to claim 11, wherein at least one U-shaped recess is present in each of the two sidewalls, so that a lug is provided which projects in a direction away from the central longitudinal axis and is connected to the sidewall on one side.

14. The connection arrangement according to claim 1, wherein the rectangular bottom:

a) has at least one passage hole, and/or b) has at least one lug projecting beyond the second surface on one side.

\* \* \* \* \*